(12) United States Patent
Nagel et al.

(10) Patent No.: US 8,596,048 B2
(45) Date of Patent: Dec. 3, 2013

(54) METHOD FOR OPERATING AN EXHAUST GAS PURIFICATION DEVICE HAVING A HEATING APPARATUS AND MOTOR VEHICLE HAVING THE DEVICE

(75) Inventors: Thomas Nagel, Engelskirchen (DE); Carsten Kruse, Troisdorf (DE); Gerhard Kahmann, Wolfenbüttel (DE); Thorsten Düsterdiek, Hannover (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 162 days.

(21) Appl. No.: 13/225,716

(22) Filed: Sep. 6, 2011

(65) Prior Publication Data

US 2012/0042634 A1    Feb. 23, 2012

Related U.S. Application Data

(63) Continuation of application No. PCT/EP2010/052462, filed on Feb. 26, 2010.

(30) Foreign Application Priority Data

Mar. 6, 2009   (DE) .................. 10 2009 012 094

(51) Int. Cl.
*F01N 3/00* (2006.01)
*F01N 3/10* (2006.01)

(52) U.S. Cl.
USPC ............... 60/300; 60/284; 60/285; 60/286; 60/303

(58) Field of Classification Search
USPC ............ 60/274, 284, 285, 286, 299, 300, 303
See application file for complete search history.

(56) References Cited

U.S. PATENT DOCUMENTS

| 5,224,335 A | 7/1993 | Yoshizaki |
| 5,322,672 A | 6/1994 | Breuer et al. |

(Continued)

FOREIGN PATENT DOCUMENTS

| DE | 196 48 427 A1 | 6/1998 |
| DE | 102005015853 A1 | 10/2006 |

(Continued)

OTHER PUBLICATIONS

International Search Report of PCT/EP2010/052462, Dated May 25, 2010.

*Primary Examiner* — Kenneth Bomberg
*Assistant Examiner* — Audrey K Bradley
(74) *Attorney, Agent, or Firm* — Laurence A. Greenberg; Werner H. Stemer; Ralph E. Locher

(57) ABSTRACT

A method for operating a device for the purification of exhaust gas of an internal combustion engine which is operated with an excess of air includes heating at least one heating apparatus of the device above a predetermined first setpoint temperature. The at least one heating apparatus is at least partially in contact with the exhaust gas, can be activated by electrical energy and is formed at least partially with an oxidation coating. At least the temperature of the at least one heating apparatus or of the exhaust gas is subsequently monitored. An increase in the hydrocarbon fraction of the exhaust gas is initiated if at least the temperature of the heating apparatus or of the exhaust gas has reached a threshold temperature or a low-load phase of the internal combustion engine is present. A motor vehicle having the device is also provided.

6 Claims, 2 Drawing Sheets

(56) References Cited

U.S. PATENT DOCUMENTS

| | | |
|---|---|---|
| 5,325,038 A | 6/1994 | Banzai et al. |
| 5,996,338 A | 12/1999 | Hirota |
| 6,381,955 B1 * | 5/2002 | Morganti et al. ............... 60/300 |
| 2010/0126147 A1 | 5/2010 | Konieczny et al. |
| 2010/0242459 A1 | 9/2010 | Tsujimoto et al. |
| 2011/0214414 A1 | 9/2011 | Gonze et al. |

FOREIGN PATENT DOCUMENTS

| | | |
|---|---|---|
| DE | 10 2007 025 419 A1 | 12/2008 |
| DE | 102008028005 A1 | 1/2009 |
| EP | 2239432 A1 | 10/2010 |
| JP | 2009156168 A | 7/2009 |
| WO | 8910471 A1 | 11/1989 |

\* cited by examiner

METHOD FOR OPERATING AN EXHAUST GAS PURIFICATION DEVICE HAVING A HEATING APPARATUS AND MOTOR VEHICLE HAVING THE DEVICE

CROSS-REFERENCE TO RELATED APPLICATION

This is a continuation, under 35 U.S.C. §120, of copending International Application No. PCT/EP2010/052462, filed Feb. 26, 2010, which designated the United States; this application also claims the priority, under 35 U.S.C. §119, of German Patent Application DE 10 2009 012 094.7, filed Mar. 6, 2009; the prior applications are herewith incorporated by reference in their entirety.

BACKGROUND OF THE INVENTION

Field of the Invention

The present invention relates to a method for operating a device for the purification of exhaust gas of an internal combustion engine which is operated with an excess of air. The device includes at least one heating apparatus which is at least partially in contact with exhaust gas, which can be activated through the use of electrical energy and which is formed at least partially with an oxidation coating. The method is used, in particular, in exhaust systems of diesel engines of vehicles, in particular passenger motor vehicles. The invention also relates to a motor vehicle having an exhaust gas purification device.

It is known to use electrically heatable honeycomb bodies to already attain a so-called light-off temperature for the oxidation coating, for example temperatures above 200° C., a short time after a cold start and/or restart of the internal combustion engine. Starting from that temperature, catalytic assistance of the conversion of the pollutants contained in the exhaust gas can take place with the aid of the oxidation coating, wherein an exothermic reaction is set in motion, in such a way that the temperature of the exhaust gas can be quickly increased further and also downstream exhaust-gas treatment units quickly reach their temperature required for catalytic conversion. In that respect, it is also to be considered known that the heating apparatus is activated for a predetermined time period, in particular after the cold start or restart, and is thereafter deactivated. Thereafter, in particular in the case of fuels with an increased hydrocarbon fraction, part, portion or component, conditions are present under which the activity of the exhaust-gas purification units can be maintained due to the exothermic reactions.

Specifically in the case of internal combustion engines which are operated with an excess of air, such as for example diesel engines, a composition of the exhaust gas is often present, that is to say the fraction of hydrocarbons is lower. Furthermore, in the case of such internal combustion engines, it must be taken into consideration that the exhaust gas is usually conducted into the exhaust system at a lower temperature, in particular in order to avoid high nitrogen oxide fractions. Furthermore, it has also been recognized that internal combustion engines of that type conduct cool exhaust-gas volumes through the exhaust system in relatively large quantities specifically in the low-load range. Under those circumstances, the problem can arise that the light-off temperature of the oxidation coating is undershot considerably, and therefore the activity of the exhaust system is not ensured for all operating points.

SUMMARY OF THE INVENTION

It is accordingly an object of the invention to provide a method for operating an exhaust gas purification device having a heating apparatus and a motor vehicle having the device, which overcome the hereinafore-mentioned disadvantages and at least partially solve the highlighted problems of the heretofore-known methods and vehicles of this general type. In particular, it is sought to specify an operating method for a device of that type for the purification of exhaust gas of an internal combustion engine which is operated with an excess of air, in which operating method functionality should be maintained with regard to the operation of the internal combustion engine, with the least possible expenditure of energy.

With the foregoing and other objects in view there is provided, in accordance with the invention, a method for operating a device for purification of exhaust gas of an internal combustion engine operated with an excess of air. The method comprises:

a) heating at least one heating apparatus of the device to a temperature above a predetermined first setpoint temperature, the at least one heating apparatus being at least partially in communication with the exhaust gas, configured to be activated by electrical energy and formed at least partially with an oxidation coating;

b) subsequently monitoring at least the temperature of the at least one heating apparatus or of the exhaust gas; and c) initiating an increase in a hydrocarbon fraction of the exhaust gas if at least:
   the temperature of the heating apparatus or of the exhaust gas has reached a threshold temperature, or
   a low-load phase of the internal combustion engine is present.

With regard to the device for the purification of exhaust gas of an internal combustion engine which is operated with an excess of air, the invention proceeds in particular from an exhaust system which is connected to a diesel engine and/or to a lean-burn engine. In this case, the device generally includes an exhaust line into which at least one heating apparatus is integrated. The heating apparatus may be activated with electrical energy according to demand, wherein for example electrical current flows through the heating apparatus and the latter is heated due to the ohmic resistance heat. For this purpose, the heating apparatus may be connected to a corresponding on-board electrical system, for example 12V or 24V. Such a heating apparatus generally forms a relatively large surface area past which the exhaust gas flows. The surface area may in part be formed with an oxidation coating. An embodiment is preferable in which the entire surface area which comes into contact with exhaust gas is formed with an oxidation coating. The oxidation coating may itself take different forms. It will generally have a washcoat coating doped with noble metals such as for example platinum, rhodium and the like. It is also preferable for the heating apparatus to be the first exhaust-gas aftertreatment unit downstream of the internal combustion engine with which the exhaust gas comes into contact for catalytic conversion.

In the case of such a device, it is thus firstly proposed according to step a) that the heating apparatus be utilized to attain a predetermined first setpoint temperature. The first setpoint temperature should be selected in such a way that the oxidation coating has adequate activity or effectiveness with regard to the conversion of the pollutants contained in the exhaust gas. In this respect, step a) is carried out in particular during starting-up of the internal combustion engine. For this purpose, the heating apparatus may for example be supplied with electrical energy, which is extracted for example from the battery of the motor vehicle or from a similar apparatus, for an excess of up to 20 seconds.

Thereafter, that is to say during the further operation of the device, at least the temperature of the at least one heating apparatus or of the exhaust gas is monitored. It is self-evidently also possible for both temperatures to be monitored. For this purpose, sensors may be provided which are in contact with the exhaust gas and/or with the heating apparatus, although it is also possible for the temperature to be at least partially calculated or estimated, for example on the basis of data models. The monitoring may be carried out continuously and/or at predetermined times after predetermined intervals or in reaction to particular states of the internal combustion engine.

On the basis of the monitoring, it is possible to carry out a comparison with a predetermined threshold temperature of the heating apparatus and/or of the exhaust gas. If the threshold temperature is reached or undershot, it is proposed herein that the exhaust-gas composition be varied in such a way that the hydrocarbon fraction is increased. In this respect, the threshold temperature preferably lies above the so-called light-off temperature of the oxidation coating. The additional hydrocarbons now have the effect that more thermal energy is provided as a result of the exothermic reaction of the hydrocarbons on the oxidation coating, and therefore a further drop in the temperature of the heating apparatus or of the oxidation coating is prevented. Alternatively or additionally thereto, it is also possible in general for the increase in the hydrocarbon fraction in the exhaust gas to be initiated when a low-load phase of the internal combustion engine is identified and/or initiated. "Low-load phase" refers in particular to an operating mode of the internal combustion engine at low rotational speed and/or load, that is to say for example idle, overrun and the like. Specifically in the case of diesel engines, during such a low-load phase, a large fraction of air at low temperature is conducted through the device for the purification of exhaust gas, which can lead to cooling of the exhaust-gas treatment units. This is counteracted by virtue of the hydrocarbon fraction of the exhaust gas being raised and the chemical exothermic reactions taking place with greater intensity.

In this way, the invention is detached from the notion that only the heating apparatus serves for maintaining the effectiveness or the conversion capability of the exhaust system. In fact, it is proposed herein that the heating apparatus be used only in a few operating phases, for example only during the starting phase of the internal combustion engine. During a subsequent operation, it is thus preferable in this case for the maintenance of the conversion capability to be ensured, and a further activation of the heating apparatus through the use of electrical energy to be avoided, through the use only of step c). It is thereby possible in particular for the electrical supply system of the motor vehicle to be relieved of load, in such a way that adequate energy for the other components of the motor vehicle can be provided in this case.

In accordance with another mode of the invention, the increase in the hydrocarbon fraction of the exhaust gas is carried out in such a way that the conversion of the hydrocarbons of the exhaust gas on the oxidation coating prevents the at least one heating apparatus from cooling down to below a second setpoint temperature. In this respect, the increase in the hydrocarbon fraction takes place, for example, by taking into consideration the present or expected temperature of the heating apparatus and/or of the exhaust gas, the reactivity of the generated exhaust gas, the surface area provided with oxidation coating, the type of low-load phase, etc. The second setpoint temperature preferably lies below the first setpoint temperature. It is, however, desirable for the second setpoint temperature to be selected to be higher than the so-called light-off temperature of the oxidation coating.

In accordance with a further mode of the invention, a plurality of cylinders of the internal combustion engine are formed with a fuel dosing device, wherein in step c), a predetermined amount of fuel is provided for the at least one heating apparatus by at least one fuel dosing device. Specifically, diesel engines generally have 4, 6, 8 or 12 cylinders through which the fuel/air mixtures supplied to the internal combustion engine are supplied and burned. The fuel dosing device is realized, for example, through the use of injection nozzles which are connected to the fuel supply system and which can be activated in a regulated manner. That is to say, in other words, that the fuel dosing takes place in such a way that the fuel is introduced (unburned) into the device for the purification of exhaust gases, and consequently finally reaches the heating apparatus. It is sought for an exothermic reaction with the hydrocarbon fraction of the fuel to first take place on the oxidation coating of the heating apparatus, in such a way that in this case, thermal energy is generated for attaining the operating temperature of the heating apparatus above the light-off temperature. It is basically possible for the required amount of fuel to be introduced as a whole, or in an apportioned manner, into the device for the purification of exhaust gas by one (different) fuel dosing device in each case.

In accordance with an added mode of the invention it is, however, preferable in this case for all of the fuel dosing devices of all of the cylinders of the internal combustion engine to always provide a partial amount of the predetermined amount of fuel. That is to say, for example, that the amount of fuel which is required to set the desired operating conditions in the exhaust system is firstly identified. That amount of fuel is now preferably distributed uniformly between the number of available fuel dosing devices, in such a way that these each inject their partial amount (in particular in a time-offset manner). This has the advantage that all of the cylinders, and likewise the downstream exhaust lines, are utilized equally. It is thereby also ensured that certain regions of the exhaust system do not come into more intense contact with the fuels than others, which prevents in particular possible aging of the exhaust line and/or of the exhaust-gas purification units and in particular of the oxidation coating on the heating apparatus.

In accordance with an additional mode of the invention, the increase in the hydrocarbon fraction of the exhaust gas takes place in an overrun phase of the internal combustion engine. The overrun phase occurs during driving operation, for example when a deceleration of the vehicle takes place or the vehicle is situated on a downhill slope, wherein a driver demand torque predetermined by the driver is lower than a present thrust torque of the motor vehicle. In the overrun phase, the fuel supply is conventionally stopped, in such a way that the internal combustion engine is operated in the unfired mode (overrun fuel cut-off). A particularly low hydrocarbon fraction is therefore encountered in the exhaust gas, wherein in this case, the method according to the invention is deviated from if the corresponding preconditions are present.

In accordance with yet another mode of the invention, in this case it is determined whether, in step c), the at least one heating apparatus is prevented from cooling down to below a second setpoint temperature. In the case of a negative evaluation, the at least one heating apparatus is additionally intermittently activated through the use of electrical energy. In other words, this means that, already before and/or during step c), it is checked whether the temperature of the heating apparatus above a second setpoint temperature can be attained solely through the use of the increase in the hydrocarbon fraction. If this is not possible, for example because too large a temperature drop is to be expected and/or the amount of fuel required for this purpose is too large, the heating apparatus is reactivated through the use of electrical energy as a type of "emergency measure." This should, however, take place not in a continuous fashion but rather intermittently, that is to say in particular in a clocked manner. For this purpose, the heating apparatus is supplied with electrical energy multiple times, for example more than 10 times or 20 times over a time period of less than 1 s, wherein pauses of less than one second are likewise observed. For example, the heating apparatus may be supplied with electrical current for 10 to 50 ms [milliseconds] and thereafter deactivated with a pause for a similar length of time before a new electrical current impulse is generated. With this intermittent mode of operation, the use of electrical energy is reduced, and the on-board electrical system is relieved of load.

With the objects of the invention in view, there is concomitantly provided a motor vehicle, comprising an internal combustion engine operated with an excess of air and having a plurality of cylinders and fuel dosing devices each associated with a respective one of the cylinders. A device for purification of exhaust gas produced in the internal combustion engine has at least one heating apparatus in the form of an electrically heatable honeycomb body. A voltage source and a control unit are connected to the honeycomb body. The motor vehicle and the control unit are configured for carrying out the method according to the invention.

The motor vehicle is, in particular, a passenger motor vehicle equipped with a diesel engine. Even though it is basically adequate for only one heating apparatus to be provided for treating the entire exhaust-gas flow, it is nevertheless also possible for a plurality of heating apparatuses to be provided, for example in different, separate flow paths of the exhaust gas. The construction of the heating apparatus in the form of an electrically heatable honeycomb body has the advantage that particularly close contact with the exhaust gas is made possible in this case. As an example of an electrically heatable honeycomb body of that type, reference is made to International Publication No. WO 89/10471 A1, corresponding to U.S. Pat. Nos. 5,146,743 and 5,322,672. The electrically heatable honeycomb body accordingly preferably includes a metallic honeycomb structure which is constructed with a multiplicity of at least partially structured metallic foils which form channels through which the exhaust gas can flow. In this case, the honeycomb body is partially electrically insulated with respect to one another and connected to the voltage source in such a way that one or more flow paths through the honeycomb structure are formed. Consideration is given for example to a generator and/or a battery as a voltage source. The control unit may also be part of an engine controller, in such a way that in this case, a supply of electrical energy at predetermined times, taking into consideration diverse operating parameters of the motor vehicle, is made possible. The control unit may accordingly also include a corresponding data model and/or a corresponding item of software which realizes a corresponding operating mode according to the invention.

Other features which are considered as characteristic for the invention are set forth in the appended claims, noting that the features listed individually in the claims can be combined with one another in any desired technologically expedient manner and highlight further embodiments of the invention.

Although the invention is illustrated and described herein as embodied in a method for operating an exhaust gas purification device having a heating apparatus and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
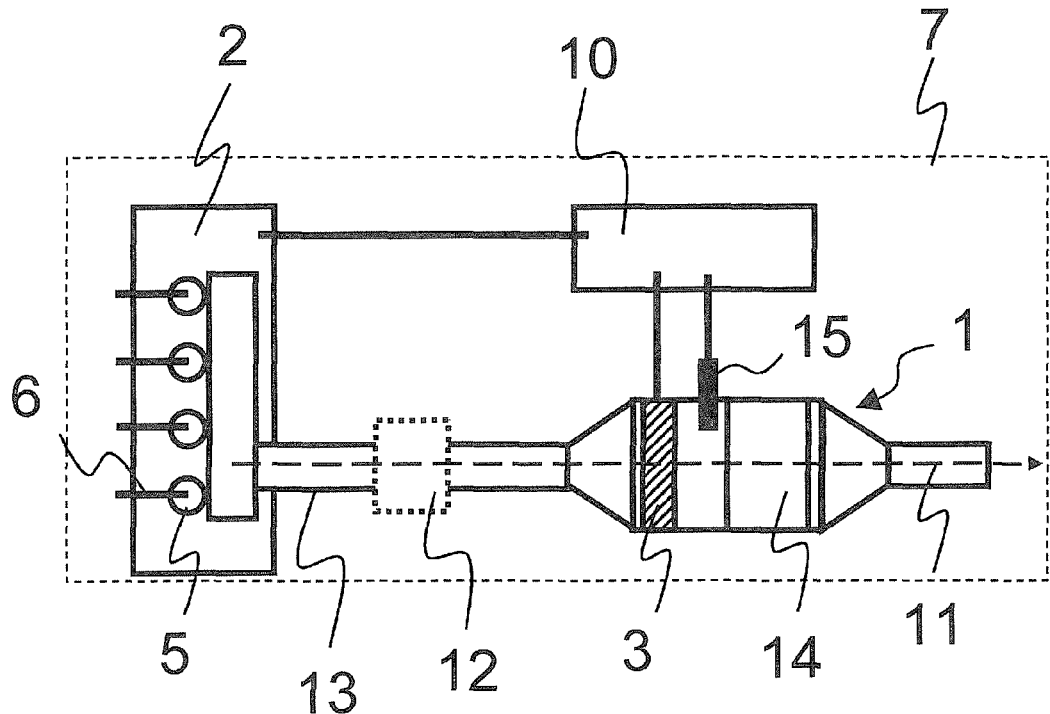
FIG. 1 is a diagrammatic, plan view of a motor vehicle having an exhaust-gas aftertreatment device.

Referring now in detail to the figures of the drawing for explaining the invention and the technical field in more detail by showing particularly preferred structural variants to which the invention is not restricted, and first, particularly, to FIG. 1 thereof, there is seen a diagrammatic illustration of a motor vehicle 7 having an internal combustion engine 2, in particular in the form of a diesel engine. In this case, the internal combustion engine 2 includes four cylinders 5, each of which have a separate, independently operable fuel dosing device 6. The exhaust gas generated in the cylinders 5 is then merged in an exhaust line 13 in which, for example, a turbocharger 12 may also be integrated. The turbocharger 12 may be constructed, for example, in the form of an exhaust-gas turbocharger which at the same time serves to supply air, in compressed form, which is required for the combustion processes in the internal combustion engine. It is basically possible for oxidation catalytic converters to be provided between the cylinders 5 and the turbocharger 12, although this is not imperative. It is therefore also possible for the exhaust gas, which is conducted through the exhaust line 13 in an indicated flow direction 11, to impinge firstly on a heating apparatus 3 which has an oxidation coating and is part of a device 1 for purification of the exhaust gas of the internal combustion engine 2. A plurality of additional exhaust-gas treatment units 14, for example particle traps, adsorbers, reduction catalytic converters, three-way catalytic converters and the like, may be provided further downstream. In order to operate the device 1 and to purify the exhaust gas of the internal combustion engine 2, a control unit 10 is provided which interacts, in particular, with the internal combustion engine 2 and the heating apparatus 3. Furthermore, the control unit 10 may interact with sensors 15 which measure, for example, the temperature of the exhaust gas.

Figure 2:
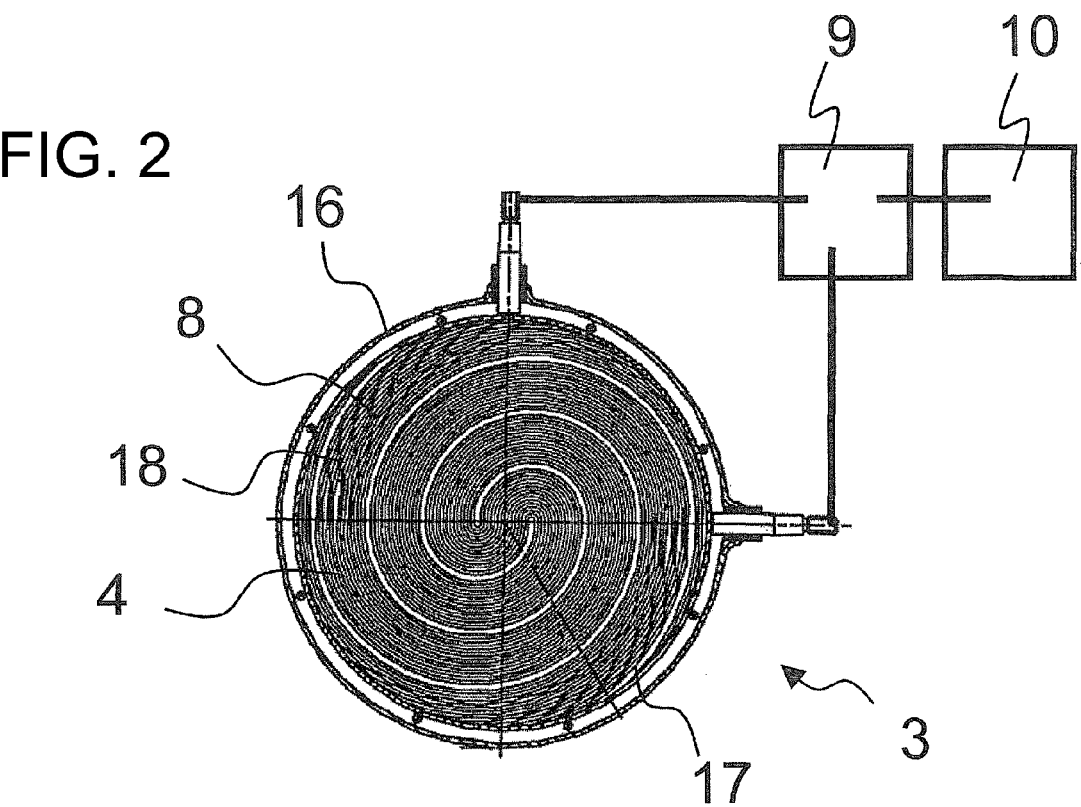
FIG. 2 is an end-elevational view of an electrically heatable honeycomb body.

FIG. 2 diagrammatically shows an end view of a structural variant of an electrically heatable honeycomb body 8 as a preferred structural variant of a heating apparatus 3. The honeycomb body 8 has a multiplicity of smooth and corrugated metal foils 18 which are wound with one another and which bear against one another in an alternating manner and provide channels 17 for a throughflow of the exhaust gas. All of the metal foils 18 are provided with an oxidation coating 4. In this case, individual packets, bundles or stacks of the metal foils 18 are electrically insulated with respect to one another, in such a way that electrical current can be supplied as required from one electrode, flows through the honeycomb body 8 and is collected again by another electrode. The metal foils 18 are furthermore mounted in an electrically insulated manner in a housing 16, with the electrodes being guided through the metal foils likewise in an electrically insulated manner. In order to operate the honeycomb body 8, a voltage source 9 is provided which interacts with the control unit 10 in order to supply electrical energy to the heating apparatus 3 as required.

Figure 3:
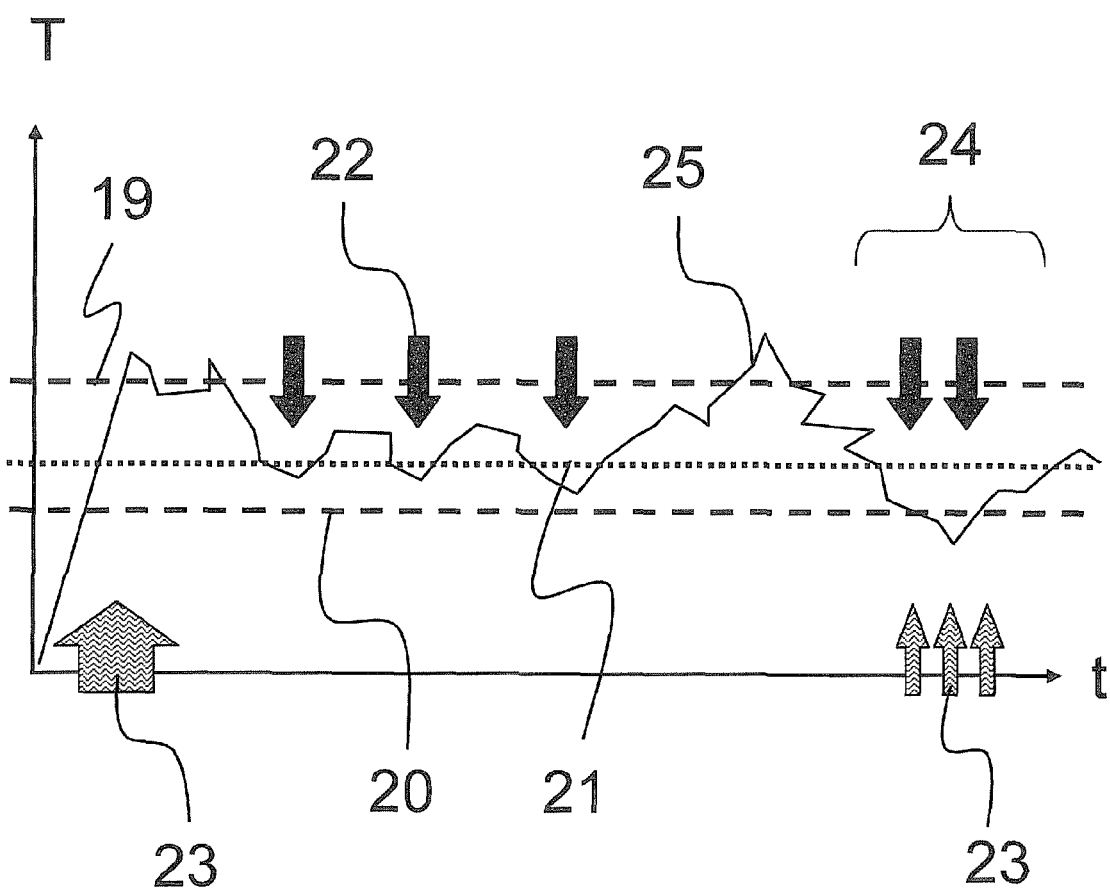
FIG. 3 is a temperature profile diagram.

FIG. 3 graphically shows a monitored temperature profile 25 during which the device for the purification of exhaust gas is operated, as plotted on a graph showing temperature T and time t. At the left of FIG. 3, it is illustrated that, firstly, in a first time period, electrical energy 23 is supplied to the heating apparatus in such a way that the exhaust gas or the heating apparatus reaches or exceeds a first setpoint temperature 19 as quickly as possible after a cold start. The first setpoint temperature 19 is preferably considerably higher than a light-off temperature of the oxidation coating, for example 100° C. higher than the light-off temperature. Due to the driving cycle, after a shut-off of the electrical energy 23, the monitored temperature profile 25 will vary corresponding to the load of the internal combustion engine. If it is, however, identified that the monitored temperature falls below a threshold temperature 21, hydrocarbons 22 are supplied in such a way that an exothermic reaction takes place on the oxidation coating of the heating apparatus and the temperature rises again. In this way, it is achieved, in particular, that the monitored temperature profile 25 runs above the threshold temperature 21 again. The dosing of hydrocarbons 22 preferably takes place every time the threshold temperature 21 is undershot. The threshold temperature 21 is likewise higher than the light-off temperature of the oxidation coating, for example at least 30° C. higher.

Illustrated at the right in FIG. 3 is a possible scenario, such as could arise in an extreme low-load phase 24, in particular during a relatively long period of overrun fuel cut-off. In this case, the temperature profile 25 falls considerably below the threshold temperature 21, in such a way that in this case, in addition to an increased, if appropriate multiple, dosing of hydrocarbons 22, electrical energy 23 is additionally supplied intermittently through the use of the heating apparatus. With this combined measure, it can likewise be quickly achieved that the monitored temperature profile runs above the threshold temperature 21.

The increase in the hydrocarbon fraction of the exhaust gas is carried out in such a way that the conversion of the hydrocarbons of the exhaust gas on the oxidation coating 4 prevents the at least one heating apparatus 3 from cooling down to below a second setpoint temperature 20.

It is determined if an increase in the hydrocarbon fraction of the exhaust gas will prevent the at least one heating apparatus 3 from cooling down to below the second setpoint temperature 20, and if the determination is negative, the at least one heating apparatus 3 is additionally intermittently activated with electrical energy.

It is pointed out that a range of measures may be modified without departing from the concept according to the invention. This refers, in particular, to the different embodiments of the heating apparatus, the position thereof in the exhaust gas, the sensor measurement device and the like. The method may self-evidently also advantageously be expedient, if appropriate, in other internal combustion engines.

The invention claimed is:

1. A method for operating a device for purification of exhaust gas of an internal combustion engine operated with an excess of air, the method comprising the following steps:
 a) heating at least one heating apparatus of the device to a temperature above a predetermined first setpoint temperature, the at least one heating apparatus being at least partially in communication with the exhaust gas, configured to be activated by electrical energy and formed at least partially with an oxidation coating;
 b) subsequently monitoring at least the temperature of the at least one heating apparatus or of the exhaust gas;
 c) initiating an increase in a hydrocarbon fraction of the exhaust gas if at least:
  the temperature of the heating apparatus or of the exhaust gas has reached a threshold temperature, or
  a low-load phase of the internal combustion engine is present; and
 d) determining if step c) will prevent the at least one heating apparatus from cooling down to below a second setpoint temperature, and if the determination is negative, additionally intermittently activating the at least one heating apparatus with electrical energy.

2. The method according to claim 1, which further comprises carrying out the increase in the hydrocarbon fraction of the exhaust gas in such a way that a conversion of the hydrocarbons of the exhaust gas on the oxidation coating prevents the at least one heating apparatus from cooling down to below a second setpoint temperature.

3. The method according to claim 1, which further comprises carrying out the increase in the hydrocarbon fraction of the exhaust gas in an overrun phase of the internal combustion engine.

4. The method according to claim 1, which further comprises providing a plurality of cylinders of the internal combustion engine with respective fuel dosing devices, and providing a predetermined amount of fuel for the at least one heating apparatus with at least one of the fuel dosing devices in step c).

5. The method according to claim 4, which further comprises always providing a partial amount of the predetermined amount of fuel with all of the fuel dosing devices of all of the cylinders of the internal combustion engine.

6. A motor vehicle, comprising:
 an internal combustion engine operated with an excess of air and having a plurality of cylinders and fuel dosing devices each associated with a respective one of said cylinders;
 a device for purification of exhaust gas produced in the internal combustion engine, said device having at least one heating apparatus in the form of an electrically heatable honeycomb body;
 a voltage source connected to said honeycomb body; and
 a control unit connected to said honeycomb body and programmed to perform the following steps:
 a) heating the at least one heating apparatus of the device to a temperature above a predetermined first setpoint temperature, the at least one heating apparatus being at least partially in communication with the exhaust gas, configured to be activated by electrical energy and formed at least partially with an oxidation coating;
 b) subsequently monitoring at least the temperature of the at least one hearting apparatus or of the exhaust gas;
 c) initiating an increase in a hydrocarbon fraction of the exhaust gas if at least:
  the temperature of the heating apparatus or of the exhaust gas has reached a threshold temperature, or
  a low-load phase of the internal combustion engine is present; and
 d) determining if step c) will prevent the at least one heating apparatus from cooling down to below a second setpoint temperature, and if the determination is negative, additionally intermittently activating the at least one heating apparatus with electrical energy.

* * * * *

UNITED STATES PATENT AND TRADEMARK OFFICE
CERTIFICATE OF CORRECTION

PATENT NO.        : 8,596,048 B2                                         Page 1 of 1
APPLICATION NO.   : 13/225716
DATED             : December 3, 2013
INVENTOR(S)       : Thomas Nagel et al.

It is certified that error appears in the above-identified patent and that said Letters Patent is hereby corrected as shown below:

Title Page, should read,

(73)    Assignee:    EMITEC Gesellschaft fuer Emisisonstechnologie mbH,

Lohmar, (DE); Volkswagen AG, Wolfsburg, (DE)

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,596,048 B2 |
| APPLICATION NO. | : 13/225716 |
| DATED | : December 3, 2013 |
| INVENTOR(S) | : Thomas Nagel et al. |

It is certified that error appears in the above-identified patent and that said Letters Patent is hereby corrected as shown below:

Title Page, should read,

(73)　　Assignee:　　EMITEC Gesellschaft fuer Emissionstechnologie mbH, Lohmar, (DE); Volkswagen AG, Wolfsburg, (DE)

This certificate supersedes the Certificate of Correction issued April 1, 2014.

Signed and Sealed this
Twenty-fourth Day of June, 2014

Michelle K. Lee
*Deputy Director of the United States Patent and Trademark Office*